United States Patent
Schonewolf et al.

(10) Patent No.: US 8,701,802 B2
(45) Date of Patent: Apr. 22, 2014

(54) MULTI-FUNCTIONAL TRANSPORT SYSTEM HAVING A PLURALITY OF MOBILE TRANSPORT UNITS

(75) Inventors: Werner Schonewolf, Falkensee (DE); Matthias Bruning, Berlin (DE); Eckart Uhlmann, Kiebitzreihe (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 142 days.

(21) Appl. No.: 13/345,914

(22) Filed: Jan. 9, 2012

(65) Prior Publication Data

US 2012/0175174 A1    Jul. 12, 2012

Related U.S. Application Data

(60) Provisional application No. 61/431,140, filed on Jan. 10, 2011.

(51) Int. Cl.
*B62D 51/04* (2006.01)
*B62D 59/04* (2006.01)

(52) U.S. Cl.
CPC ............... *B62D 51/04* (2013.01); *B62D 59/04* (2013.01)
USPC ........................................ 180/19.2; 180/14.2

(58) Field of Classification Search
USPC .......................................... 180/14.2; 280/408
See application file for complete search history.

(56) References Cited

U.S. PATENT DOCUMENTS

| 4,167,983 A * | 9/1979 | Seider et al. ................. 180/19.1 |
| 6,874,807 B1 | 4/2005 | Labadie et al. ............... 280/656 |
| 2005/0039957 A1 * | 2/2005 | David et al. .................. 180/19.1 |
| 2006/0048980 A1 * | 3/2006 | Kataoka et al. .............. 180/19.2 |
| 2008/0302585 A1 * | 12/2008 | Perelli et al. ................. 180/14.1 |

FOREIGN PATENT DOCUMENTS

| DE | 631709 | 6/1936 | |
| DE | 102006037588 | 2/2008 | ............... B62D 6/00 |
| DE | 202008006289 | 9/2008 | ............. B62D 47/00 |

OTHER PUBLICATIONS

German Patent Office Action for related German application 10 2011 008 226.3 mailed Aug. 12, 2011.

* cited by examiner

*Primary Examiner* — Tony Winner

(74) *Attorney, Agent, or Firm* — Renner Kenner Greive Bobak Taylor & Weber

(57) ABSTRACT

A multi-functional transport system is disclosed having a plurality of mobile transport units, which each have a coupling device in a front and a rear region. In this manner the transport units can be coupled to each other and/or to a lead vehicle. In one configuration, the individual transport units equipped with drives follow the lead vehicle defining the path in a directionally stable manner by an independent path control system. The transport units themselves can also be removed or decoupled from the transport system as independent units. At least one handle, in addition to the couplings, can be used by an operator when in the decoupled state, so that the mailings to be transported can remain on the transport unit until delivery without manual transferring or transporting. This manual guiding of the individual transport unit takes place in a virtually force-free manner.

17 Claims, 4 Drawing Sheets

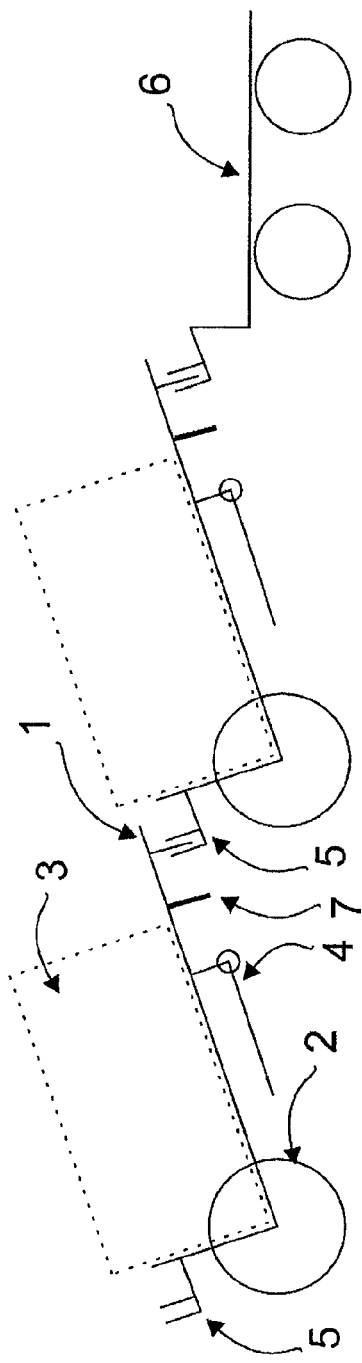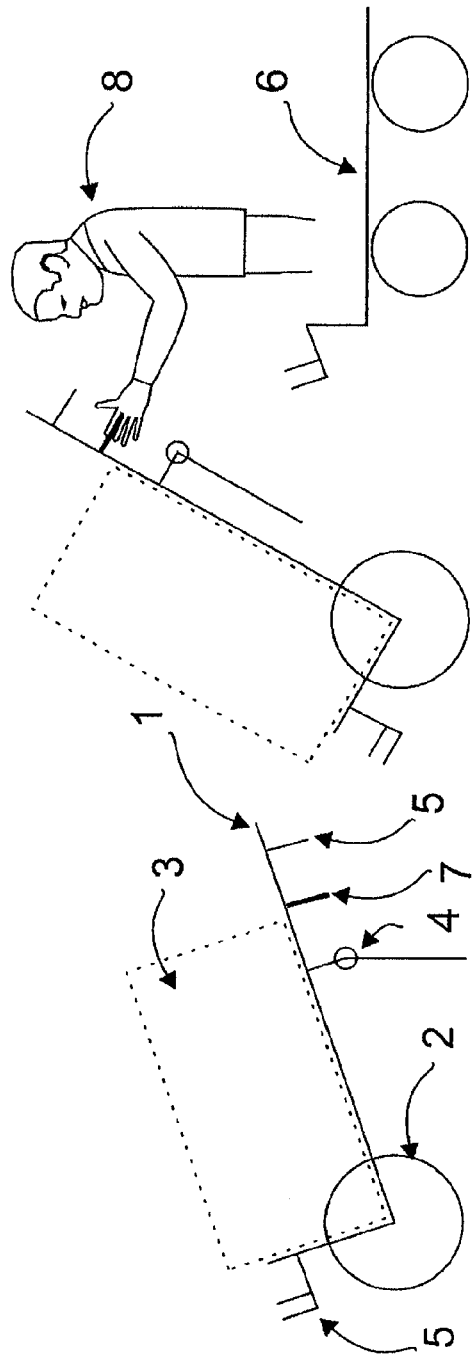

MULTI-FUNCTIONAL TRANSPORT SYSTEM HAVING A PLURALITY OF MOBILE TRANSPORT UNITS

CROSS-REFERENCE TO RELATED APPLICATIONS

This application claims priority of U.S. Provisional Application Ser. No. 61/431,140 filed Jan. 10, 2011, which is incorporated herein by reference.

TECHNICAL FIELD OF APPLICATION

The present invention relates to a mobile transport system consisting of a lead vehicle and a plurality of transport units, the transport units of which each have a coupling device in a front and a rear region, by means of which the transport units can be coupled to each other and/or to the lead vehicle.

Commercial vehicles in the compact van range of up to 3.5 t have usually been used so far for delivering mailings in the inner city region. In particular in the case of commercial customers, for example in pedestrian precincts or shopping centres, the packages are transferred manually by the delivery person from the transport vehicle to a manually guided transport means and brought to the customer. To this end, the mailings must first be transferred individually by hand into the delivery vehicle at the depot and then transferred again manually to the manually guided transport means, for example a sack barrow, in the delivery area. This repeated transfer of goods increases the costs of the delivery. Furthermore, the weight of the mailings must not exceed the reasonable physical limit (for example, currently 31.5 kg at DHL). Traffic areas of stationary traffic (parking space) and moving traffic (double parking) are occupied by the transfer process during delivery, as a result of which the flow of traffic is obstructed and emissions caused by traffic are increased.

PRIOR ART

To avoid these problems, an approach was developed as part of the EU-promoted research project FIDEUS (6th Framework Programme, Priority 6.2—Sustainable Transport Systems), in which the distance between the delivery vehicle and the customer is bridged by a vehicle train consisting of a compact lead vehicle and a plurality of compact trailers. The advantage of this solution consists in the unlimited manageability of the vehicle train both in the road and in pedestrian precincts without time restrictions, that is, also suitable for use at the start and end of the day.

The realisation of a directionally stable mode of driving the mobile transport units or trailers, in which the wheels of all the trailers follow the track of the lead vehicle without lateral deviations, improves the navigability of the vehicle train. Such a mode of driving has been realised for a conventional articulated vehicle by a regulated articulation of the trailer wheels, as can be found for example in DE 10 2006 037 588 A1.

The object of the present invention consists in providing a transport system having mobile transport units, which allows an improvement in manageability, a reduction in vehicle complexity compared to existing solutions, and universal use, in particular for the transport and delivery of goods in an urban environment.

PRESENTATION OF THE INVENTION

The object is achieved with the transport system according to patent Claim 1. Advantageous configurations of the transport system form the subject matter of the dependent patent claims or can be found in the following description and the exemplary embodiment.

The proposed transport system comprises a plurality of mobile transport units, which can have single or multiple axles and each have a coupling device in a front and a rear region, by means of which they can be coupled to each other and/or to a lead vehicle. The transport system is characterised in that each transport unit has at least one handle, by means of which the transport unit can be guided manually by an operator.

The individual transport units can thus be handled very flexibly for the operator. On the one hand, the transport units can be brought as near as possible to the delivery point, as was previously usual, in the vehicle train with a lead vehicle. On the other hand, each individual transport unit can easily be decoupled from the vehicle train by the operator and brought manually to the delivery point like a manually guided transport vehicle. It is no longer necessary to transfer the goods to be transported.

The coupling devices on the transport units can for example be mechanical, electromagnetic or virtual couplings (corresponding to an "electronic drawbar", in which the following vehicle follows the preceding vehicle without a mechanical coupling, while maintaining the same track and distance). For the formation of the vehicle train, the individual transport units are coupled one behind the other by means of the said couplings and connected to a lead vehicle. To remove the individual transport units, the operator can detach the couplings and guide the individual transport unit manually using the handle. In this case a handle means a component designed specifically for manually guiding the transport unit, by means of which the transport unit can be pulled and/or pushed and steered. Two handles or a component with two grip regions are preferably provided on the transport unit.

The individual transport units, also referred to as trailers, are configured as single-axle vehicles, wherein the axle may be mounted in the rear region of the transport unit when the transport unit is coupled to the vehicle train. The transport units are preferably configured in such a manner that they can be guided manually like a sack barrow when in the decoupled state. The axle is in this case preferably equipped with one wheel per axle end. In a further configuration, the axle can also be equipped with a plurality of wheels per axle end, for example in order to make it easier to roll over bumps or steps. Furthermore, the axle can have for example a circulating belt/chain drive per axle end.

In an advantageous development, each transport unit comprises a dedicated motorised drive. Such a drive can for example be configured on the wheel side as a wheel hub motor or as a wheel rim motor, depending on the design. Each transport unit comprises a dedicated drive system regulated on the basis of sensor data with a control unit, which can undertake both the driving of the transport units themselves and the steering of the transport units. Sensors are arranged on the transport unit, for example on the handle or handles or on a connection of the handle or handles to the transport unit, by means of which sensors the forces exerted on the transport unit by the operator via the handle can be detected directly or indirectly. The control unit then controls the drive on the basis of these forces, in order to support the movement of the transport unit intended by the operator. The transport unit follows the guiding gestures of the operator. The operator only has to introduce small forces into the handle or handles for guiding. The propulsion necessary for following the operator is provided by the drive system of the transport unit.

The control unit preferably also comprises sensors in connection with a balance regulation system. The drive wheels are controlled during manual guiding of the transport unit in such a manner that the transport unit independently remains in a balanced position, that is, cannot tip over in an uncontrolled manner, without the intervention of the operator. Such regulated monitoring of the inclination of the transport unit is known to a person skilled in the art for example from a single-axle vehicle for conveying persons. The said vehicle is not however suitable for transporting goods, as in this case the driving commands are derived from the displacement of the centre of gravity of the body of the person on the vehicle; loading or unloading would therefore be interpreted as a driving command and the vehicle would automatically start moving as a result.

In an advantageous development for goods transport, the regulation system provided in the control unit reacts adaptively to changes in the load/cargo (mass and position) and in the subsurface (bumps, smoothness) and does not derive any driving commands from these changes, but rather holds the transport unit in a stable upright orientation, with the least possible change in the standing position, even when these environmental variables change. The driving command for changing the position is in this case communicated by the guiding operator who is not on the transport vehicle. To this end, corresponding sensors must of course be provided in the transport unit, advantageously in the handle or handles.

Steering of the transport unit is preferably achieved by means of the control unit by controlling the torque of the individual wheels, also known as tank steering. The individual wheels are actuated separately from each other, the steering being achieved by different rotation speeds of the wheels. In the coupled state, the transport units within the vehicle train can follow the lead vehicle in a directionally stable manner with such a steering system and suitable control by means of the control unit. To this end, sensor data of the corresponding transport unit and/or one or a plurality of the preceding transport units are used, from which the track to be followed is calculated and the actuation of the individual wheels which is necessary therefore can be defined. The coupling device is advantageously configured as a drawbar having a plurality of articulations which can be horizontally rotated (multi-link drawbar). Control for maintaining directional stability takes place for example on the basis of a path calculation for the respectively preceding transport unit by means of the measured drawbar angle to the preceding transport unit and the driving speeds and by maintaining this path by means of the control system of the dedicated drives. In such an advantageous configuration, the vehicle is therefore steered not by a central steering system (steering wheel, hand lever etc.), but by path guidance on the basis of the calculated trajectories of the preceding transport unit(s). The order of the individual transport units in the vehicle train can thereby be selected in any desired manner.

The individual transport units can also be configured in such a manner that they can move autonomously. To this end, the already mentioned control unit must be configured in such a manner that it independently controls the vehicle using the sensor data and additional data to determine its own position and the target position in order to achieve the target position.

In a further advantageous configuration, the transport units are provided with an active coupling and decoupling aid, which helps the operator during coupling and decoupling. This can take place for example in the form of a suitable support aid on the transport units, in particular of a foldable or extendible support element, for supporting the change in inclination during the transition from the coupled state to the decoupled state and vice versa. The transport units or trailers can be held in a predefined inclined position with such a coupling and decoupling aid. An example of this is the arrangement of an extendible prop or a prop provided with a wheel under the individual transport units.

The individual transport units are configured in such a manner that they can be equipped with transport containers which are permanently mounted or replaceable. These transport containers can be for example containers or wire mesh crates as are used for transfer of goods in depots. The outlay on cost-intensive transfer of the individual mailings is thus minimised.

With the proposed transport system, the efficiency of the process of delivering packages is increased precisely in inner city areas, as the manual transfer from a large-volume delivery vehicle to a manually guided transport means can be omitted, in particular for high delivery densities, such as in a shopping centre. Raising of the weight restriction of individual mailings above the currently applicable reasonable limit can also be considered, as all the mailings can remain in a transport vessel (wire mesh crate) from the depot to handover, that is, does not have to be manually transferred or transported on foot. A higher cost-efficiency of the particularly cost-intensive "last mile" can be achieved by adapting the configuration of the transport units according to need with respect to the length/transport capacity of the vehicle train and the individual vehicles including the lead vehicle.

In the preferred configuration with individual, sensor-controlled drive systems for each transport unit with a respective steering and drive regulation system, complete independence of the individual transport units is achieved in the train or in solo mode, as a result of which very flexible modularity is produced. The transport system allows a narrow, space-saving track width, which is orientated to the requirements of transporting wire mesh crates. In the particularly advantageous configuration with the directionally stable, controlled steering of the individual transport units, navigability in a small space with a turning circle of less than three meters can be achieved in the train. This makes it possible to drive in arcades and pedestrian precincts and indoors in shopping centres. Directionally stable driving takes place in the train without offsetting the following vehicles. Additional obstacles, such as dips or steps can then be easily overcome by decoupling and manually guiding the individual vehicles, in order to allow specific deliveries, for example in business centres or commercially used multi-storey buildings.

BRIEF DESCRIPTION OF THE DRAWINGS

The proposed transport system is briefly explained again below using an exemplary embodiment. In the figures:

FIG. 1 shows an example of the transport system, in this case consisting of two transport units and a lead vehicle, in the coupled state;

FIG. 2 shows the transport system of FIG. 1, in which a transport unit is decoupled;

WAYS OF REALISING THE INVENTION

Figure 3:
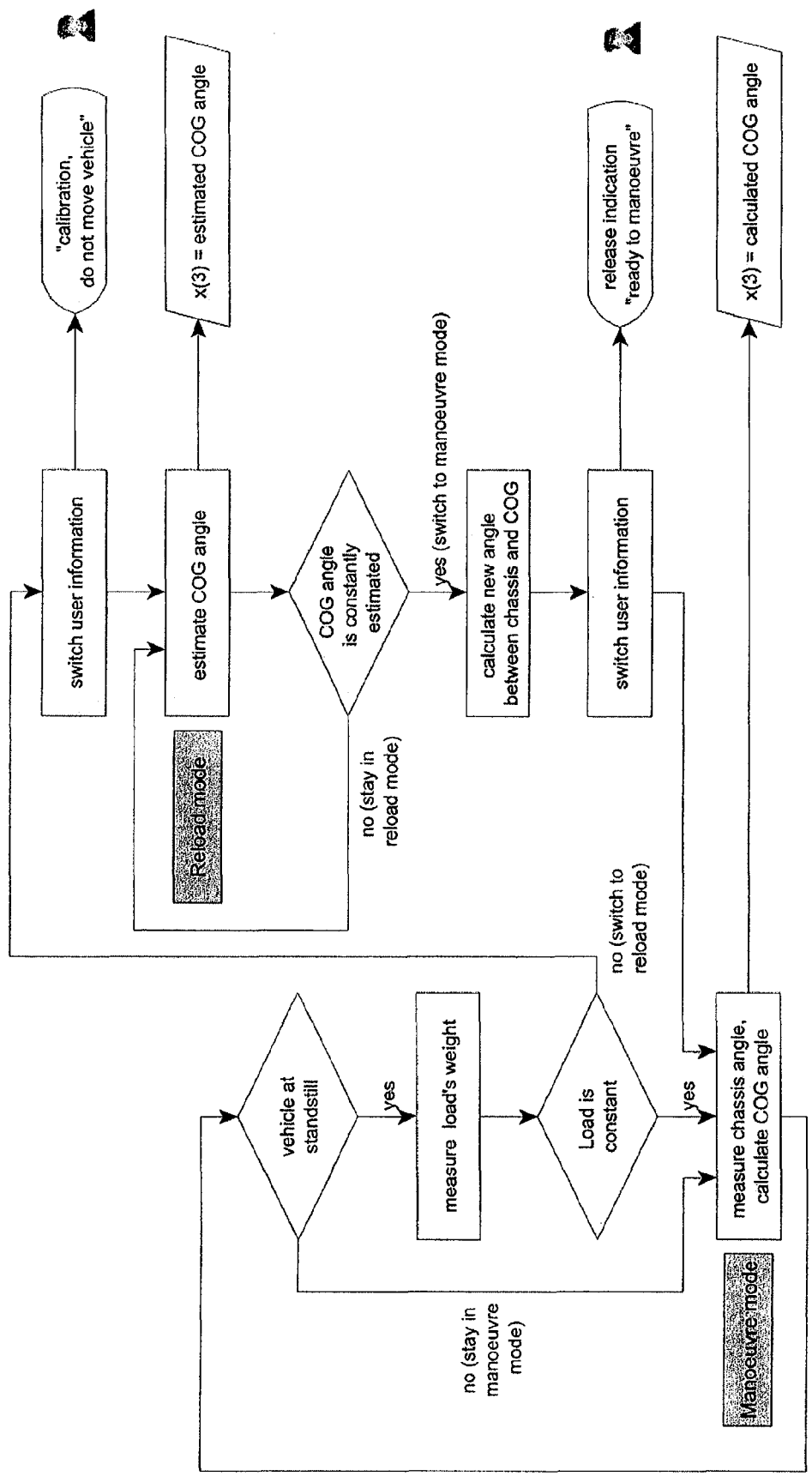
FIG. 3 shows an exemplary flow chart when indirectly detecting forces exerted on the transport unit by the operator.

FIG. 1 shows an example of a configuration of the proposed transport system in a schematic diagram. In this example only two transport units 1 and a lead vehicle 6 are shown. The transport units 1 are coupled to each other and to the lead vehicle 6 by means of their coupling devices 5. Each of the transport units 1 has a loading surface on which the load 3, for example a container or a wire mesh crate, is placed. The transport units 1 in this example have a single axle, it being possible for the wheels 2 to be controlled by drive systems (not shown).

Each transport unit 1 further has a coupling/decoupling aid, in the present example a foldable support 4, by means of which the operator 8 is helped to decouple a transport unit 1. This is indicated schematically in FIG. 2, in which the operator 8 decouples one of the transport units 1 from the vehicle train. To this end, the support 4 of the transport unit, which is situated directly behind the transport unit to be decoupled, is extended, as a result of which the transport unit to be decoupled can be decoupled more easily by the operator 8, as can be seen in FIG. 2. The transport unit 1 is guided manually by the operator 8 using the two handles 7, as is known from the previously used sack barrows, but in this case in an advantageous embodiment in a virtually force-free manner by the described active drive system.

Of course, the proposed transport system is not limited to such a configuration of the transport units.

FIG. 3 shows an exemplary flow chart when indirectly detecting forces exerted on the transport unit by the operator. For the indirect detection of the manoeuvre forces exerted by the operator on the transport unit a disturbance value estimator or observer can be used together with a measuring unit for detecting cargo changes. The measuring unit for detecting cargo changes helps to differentiate between abruptly varying forces influencing the balance of the transport unit when changing the cargo, and forces exerted by the operator on the transport unit. If a cargo change is detected, the algorithm of the control unit first estimates the new position or angle of the centre of gravity (COG) of the charged transport unit. Based on this COG position or COG angle a new quasi-stable chassis angle is calculated (see FIGS. 3 and 4). In case of a translational control of the COG (FIG. 5) a new quasi-stable axis position is calculated. The disturbance forces impacting on the transport unit and detected after the above estimation/calibration can then unambiguously be identified to be the manoeuvre forces exerted by the operator on the transport unit. During the above calibration process which is performed when detecting a cargo change, an appropriate signal may inform the operator, that the drive control of the transport unit is in the state of recalibration. The operator can thus be requested to not exert manoeuvre forces until the end of the (re)calibration process. The calibration process is again started as soon as a further cargo change is detected by the measuring unit.

Additionally the algorithm may be configured to perform the recalibration after a cargo change only at standstill of the transport unit. With this measure a disturbance of the calibration process by vertical acceleration of the cargo due to floor unevenness is avoided. In this embodiment, the cargo change must also be performed only at standstill of the transport unit.

Figure 4:
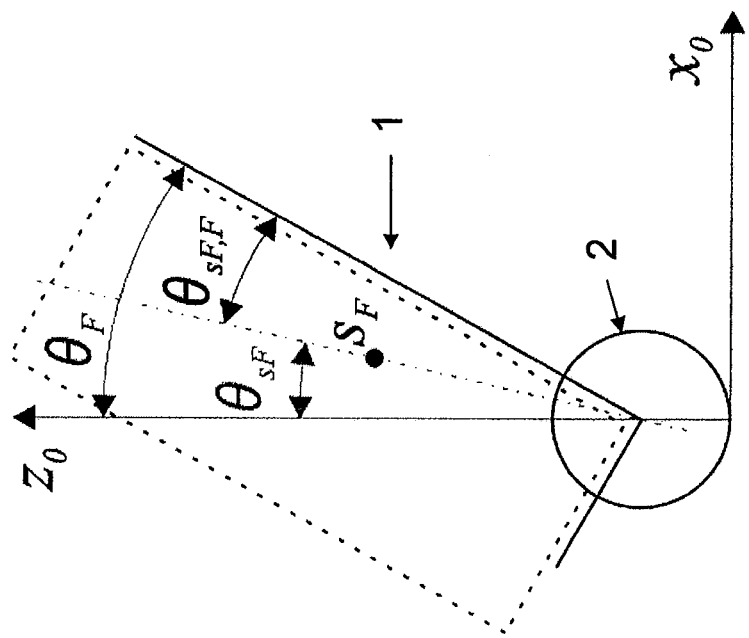
FIG. 4 shows parameters for a rotational control of the centre of gravity of the transport unit.

FIG. 4 shows parameters for a rotational control of the COG in case of a single-axle transport unit, the axle of which is mounted in the rear region of the transport unit. The angle $\theta_F$ denotes the angle between the chassis and the vertical direction $z_0$, $\theta_{sF}$ (COG angle) denotes the angle between the COG $s_F$ and the vertical direction $z_0$, and $\theta_{sF,F}$ denotes the angle between the chassis and the COG. The desired regulation of the COG angle is achieved via control of the chassis angle $\theta_F$ by appropriately controlling the rotation of the wheel of the transport unit.

Figure 5:
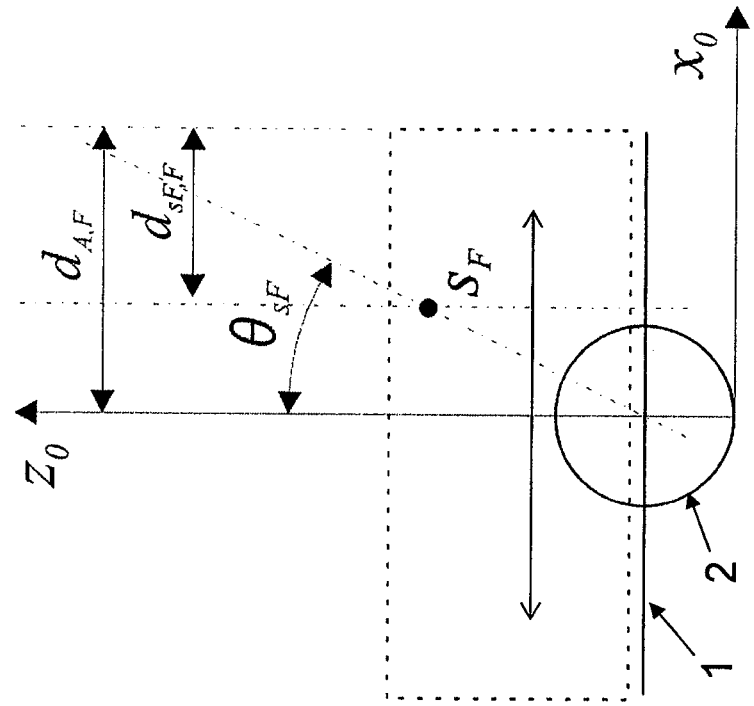
FIG. 5 shows parameters for a translational control of the centre of gravity of the transport unit.

FIG. 5 shows parameters for a translational control of the COG in case of a single-axle transport unit, the axle of which is movable relative to the chassis in driving direction of the transport unit. The distance $d_{A,F}$ denotes the distance between the axle and the end of the chassis, $\theta_{sF}$ (COG angle) denotes the angle between the COG $s_F$ and the vertical direction $z_0$, and $d_{sF,F}$ denotes the distance between the end of the chassis and the COG. The desired regulation of the COG angle is achieved via control of the variable distance $d_{A,F}$ by translational movement of the axle relative to the chassis of the transport unit.

Figure 6:
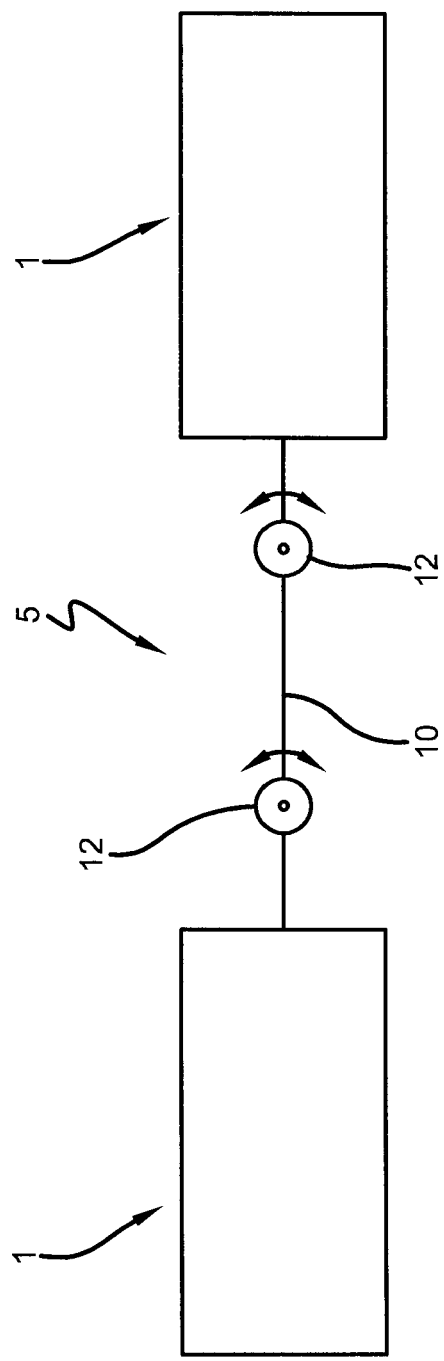
FIG. 6 is a top view showing an example of the transport system, in this case consisting of a coupling device configured as a drawbar having a plurality of articulations.

FIG. 6 shows two transport units 1 coupled to each other by a coupling device 5. The coupling device 5 is configured as a drawbar 10 having a plurality of articulations 12 which can be horizontally rotated.

While the invention has been illustrated and described in detail in the drawings and forgoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage.

LIST OF REFERENCE SYMBOLS

1 Mobile transport unit
2 Wheel
3 Load
4 Support
5 Coupling device
6 Lead vehicle
7 Handle
8 Operator

The invention claimed is:
1. A transport system comprising a plurality of mobile transport units each said mobile transport unit having a coupling device in a front and a rear region, by means of which said transport units can be coupled to each other and/or to a lead vehicle,
   wherein each said transport unit has at least one handle, which allows the transport unit to be manually guided by an operator, wherein said transport units are single-axle vehicles, the axle of which is equipped with one wheel per side, with a plurality of wheels per side or with circulating belts or chains,
   each said transport unit having a drive system with a control unit which controls the drive and thus the steering of the transport unit; and
   sensors to generate sensor data are arranged on the transport unit by means of which forces exerted on the transport unit by the operator are directly or indirectly detected by said sensors to regulate said drive system, and
   the control unit is configured to actuate the drive system during manual guiding of the transport unit on the basis of the forces detected by said sensors in order to support the movement of the transport unit intended by the operator.

2. The transport system according to claim 1,
wherein
the transport units have dedicated motorised drives.

3. The transport system according to claim 1,
wherein
the control unit is configured to actuate the drive system during manual guiding of the transport unit on the basis of the sensor data obtained by the sensors in such a manner that the transport unit remains independently in a balanced orientation.

4. The transport system according to claim 1,
wherein
the axle of the transport units is mounted on a chassis of the transport units to be movable relative to the chassis in a driving direction of the transport units and that the control unit is configured in such a manner that it controls the position of the axle relative to the chassis during manual guiding of the transport unit on the basis of the sensor data obtained by the sensors in such a manner that the transport unit remains independently in a balanced orientation.

5. The transport system according to one of claims 1 to 4,
wherein
the transport units comprise a measuring unit for detecting cargo changes.

6. The transport system according to claim 5,
wherein
the control unit makes use of the measuring unit for detecting cargo changes in order to differentiate between forces exerted on the transport unit by cargo changes and the forces exerted on the transport unit by the operator.

7. The transport system according to claim 1,
wherein
the control unit is configured in such a manner that it effects the steering of the transport unit by means of a separate control of a rotation of individual wheels of the transport unit.

8. The transport system according to claim 1,
wherein
the control unit of the transport units is configured in such a manner that, when the transport units are coupled, the control unit evaluates sensor data of at least one of the respective transport unit, one preceding transport unit, a plurality of preceding transport units and the preceding lead vehicle, calculates a path to be maintained for directionally stable movement, defines the control of the individual wheels necessary therefore and actuates the individual wheels correspondingly.

9. The transport system according to claim 1,
wherein
the control unit of the individual transport units is configured in such a manner that the transport units can move autonomously.

10. The transport system according to claim 1,
wherein
the coupling device is configured as a drawbar having a plurality of articulations which can be horizontally rotated.

11. The transport system according to claim 1,
wherein
the transport units are provided with an active coupling and decoupling aid.

12. The transport system according to claim 11,
wherein
the active coupling and decoupling aid is a foldable or extendible support element.

13. The transport system according to claim 1,
wherein
the transport units have permanently mounted transport containers or means for fastening replaceable transport containers.

14. The transport system according to claim 13,
wherein
the permanently mounted transport containers or the replaceable transport containers are wire mesh crates.

15. The transport system according to claim 1,
wherein
the sensors are arranged on the at least one handle.

16. A mobile transport unit comprising:
a transport unit having a front and a rear region;
a coupling device on each of said front region and said rear region so as to allow said transport unit to be coupled to at least one of a second mobile transport unit and a lead vehicle;
a single axle coupled to said transport unit, said single axle having one wheel per side, a plurality of wheels per side, or with a circulating belt or a chain;
at least one sensor arranged on said transport unit, said at least one sensor generating sensor data of forces exerted on said transport unit by an operator; and
a drive system having a control unit, said drive system receiving said sensor data so as to control steering of said transport unit, wherein said control unit is configured to actuate said drive system during manual guiding of said transport unit based on forces detected by said at least one sensor in order to support movement of said transport unit intended by the operator.

17. The mobile transport unit according to claim 16, further comprising
a handle carried by said transport unit, said handle having said at least one sensor arranged thereon.

* * * * *